Patented Feb. 19, 1952

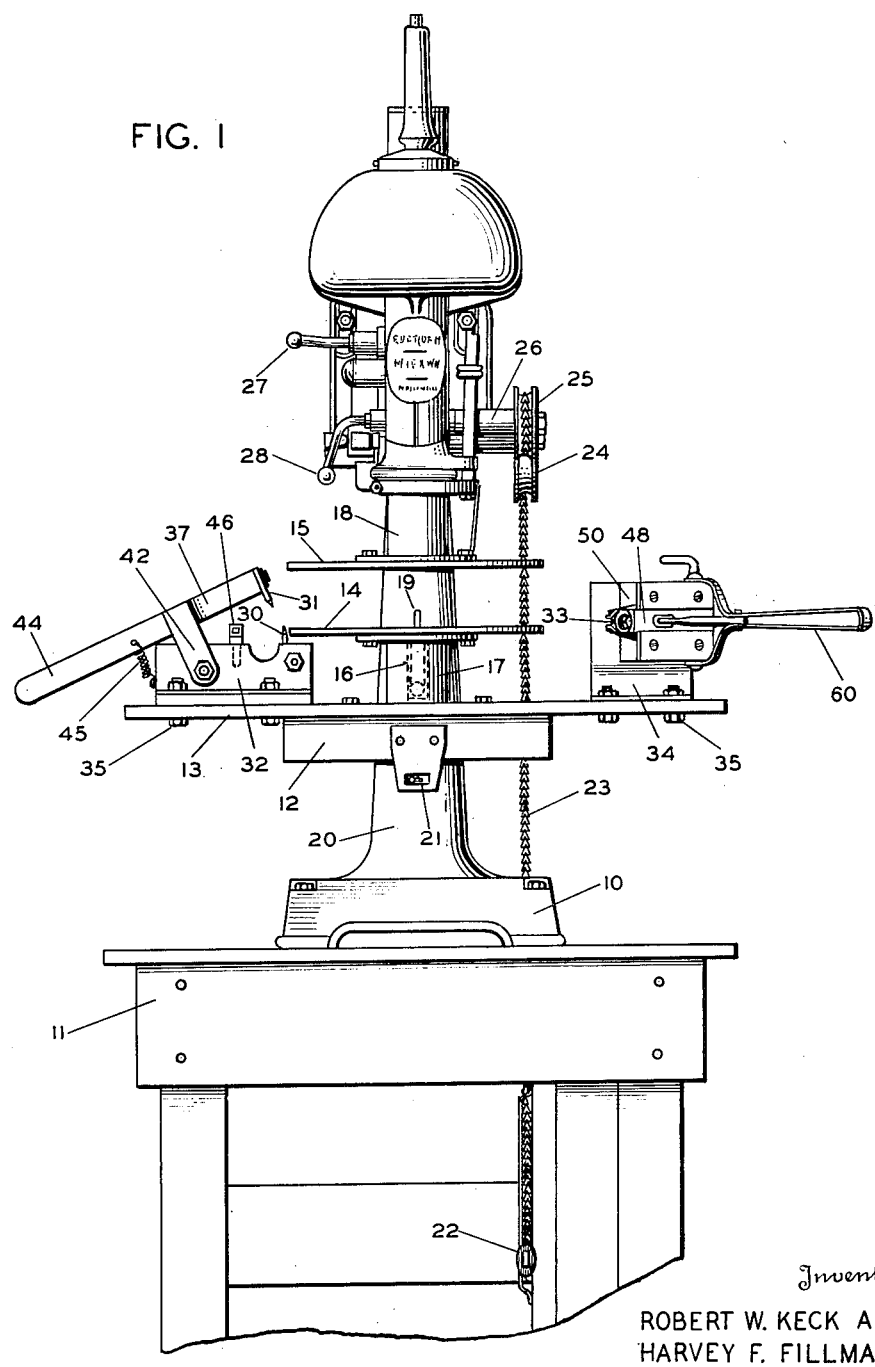

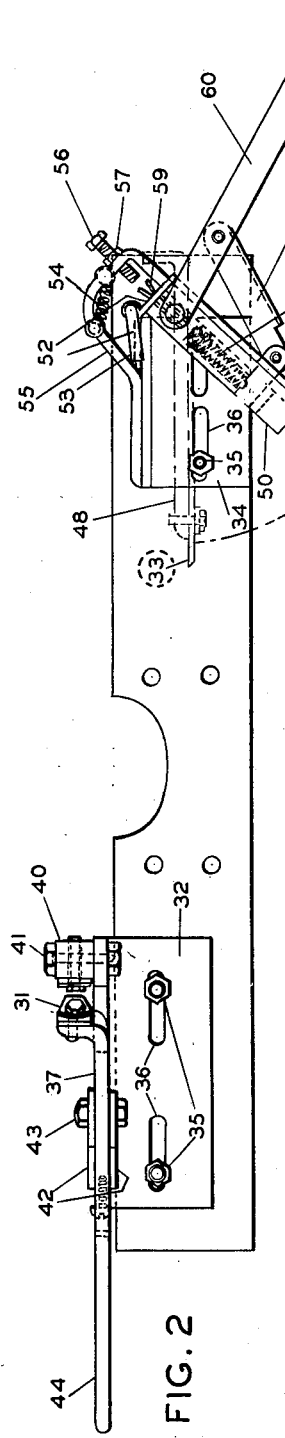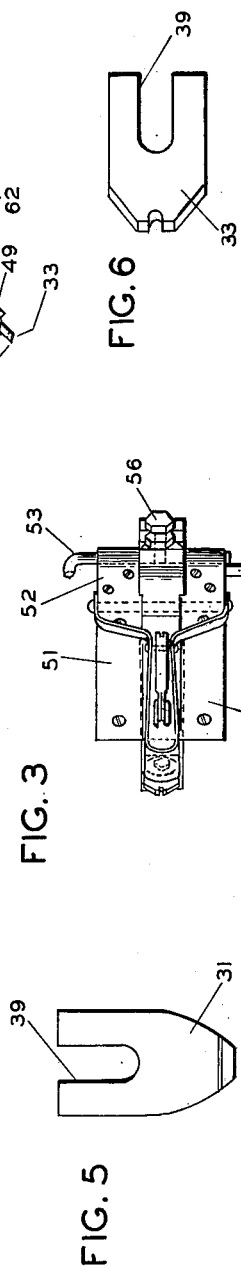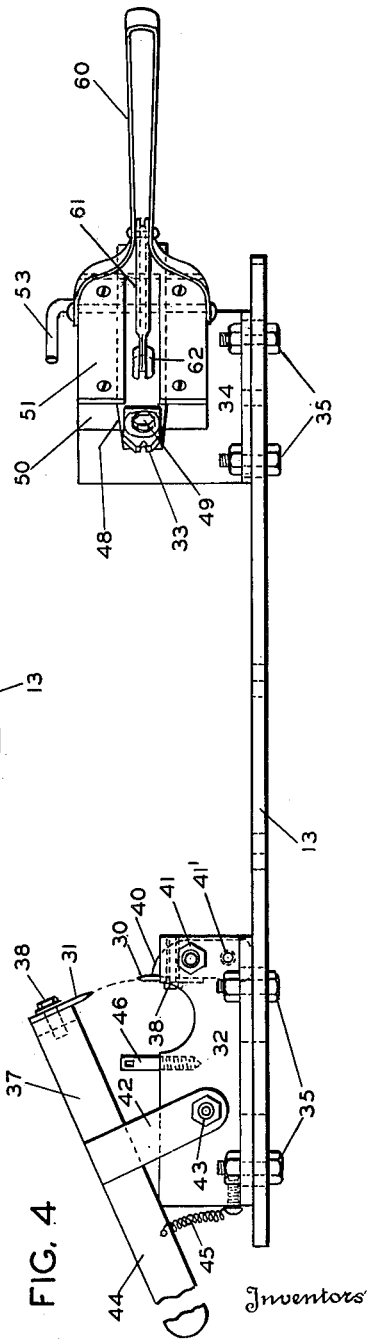

2,586,663

UNITED STATES PATENT OFFICE 2,586,663

RECORD CUTTING AND TRIMMING MACHINE

Robert W. Keck and Harvey F. Fillman, Allentown, Pa.

Application July 28, 1947, Serial No. 764,199

4 Claims. (Cl. 29—27)

This invention relates to apparatus for cutting and trimming the edges of circular discs of molded plastic material such as phonograph records, and is intended for use in connection with the molding of such articles in pressure dies.

The flash surrounding a molded disc of the type in general use for phonograph records heretofore has been trimmed off by hand and the edge of the disc smoothed by grinding or by sanding in a suitable machine, necessitating two operations. Our invention enables both the cutting and smoothing to be done quickly and neatly as successive operations in the same apparatus, thus saving time and labor and improving the appearance of the article.

The successful and smooth operation of record changing machines depends upon the records being of proper size and with smooth outer edges to prevent jamming of the machine and breaking of records, and disc records trimmed in accordance with our invention fully meet these requirements.

Other objects and advantages of our invention appear in connection with the following description of an illustrative embodiment thereof shown in the accompanying drawings, wherein:

Figure 1 is a front elevation of a vertical spindle drill press equipped with movable cutting and trimming knives for operating on a phonograph record disc held between movable platens mounted for rotation on the spindle of the machine;

Figure 2 is a plan view of the knife holders and their supporting means;

Figures 3 and 4 are respectively end and front side elevations of the knife holders and supporting means therefor:

Fig. 5 is a face view of a flash trimming cutter; and

Fig. 6 is a face view of an edge smoothing cutter.

Figs. 2, 3 and 4 are drawn to a larger scale than Fig. 1, and Figs. 5 and 6 are drawn to a still larger scale.

The apparatus shown in the drawings comprises a bench type motor driven drill press of well known make having its base 10 supported on a frame or bench 11, the lower table 12 of which in turn supports the base plate 13 of the stationary and movable knife carrying members in position to operate upon the edge of a phonograph record disk mounted for rotation between the rotatable platens 14 and 15, with which the drill press is fitted. The lower platen 14 is mounted on a vertical spindle 16 supported for free rotation in suitable anti-friction bearings in the central post 17 which projects upwards from the middle of the table 12 in vertical alignment with the spindle 18 of the drill press. A register pin 19 is provided at the center of the lower platen for positioning the record to be trimmed, and both platens are preferably faced with felt to protect the sound grooves on the faces of the record from injury during the trimming operation or in placing them in or removing them from operating position.

The driving motor and change speed gearing (not shown) are mounted as usual on the main pedestal 20 of the drill press, near its upper end, and the motor control switch 21 is placed in front of the table 12 as is usual. The upper platen 15 maybe raised and lowered with the spindle 18 by means of a suitable hand lever 22 or foot treadle through a chain 23 which operates over a guide pulley 24 and chain wheel 25 on the shaft 26 which is provided with a gear and rack or other suitable connection to the spindle 18. For convenience in operation, the lever 22 is fitted with a ratchet or latch for retaining it in raised position and thereby clamping the upper platen down upon the record disk and lower platen. Clamp levers 27, 28 are provided for clamping the spindle carrying head and spindle in proper working position as is usual in machines of this kind.

The cutting knives 30, 31 for trimming the flash from the disk are mounted on an angle bracket 32 which is adjustably secured to the base plate 13 on one side of the platens 14, 15, and the smoothing knife 33 is mounted on an angle bracket 34 which is adjustably secured to the base plate on the opposite side of the platens 14, 15 in position for these knives to be brought into successive engagement with the rotating disk clamped therebetween as the trimming and smoothing operation proceeds. Clamp bolts 35 working through slots 36 or other suitable means are provided for securing the brackets 32, 34 in adjusted position on the base plate.

The upper cutting knife 31 is secured to the free end of a lever 37 by means of a cap screw 38 working in a slot 39 in the knife to permit of some vertical adjustment of the latter; and the lower cutting knife 30 is secured to a block 40 bolted to the vertical flange of the angle bracket 32, by means of an adjusting bolt 41, and held in alignment by a dowel pin 41' as shown in Figs. 2 and 4. The lever 37 is pivoted to the angle bracket 32 by means of a pair of hinge plates 42 working on a hinge bolt 43, and has a handle 44 at its end opposite the knife 31 for manipulating it. A spring 45 normally holds the lever with the knife 31 in raised position with the handle end in contact with the edge of the vertical flange of the bracket 32, as shown in Fig. 4. An adjustable stop 46 is provided for limiting the downward movement of the cutting knife 31.

The smoothing cutter 33 is secured on the end of a slide 48 by means of a clamp screw 49, the slide being movable in a slot formed in the guide block 50 wherein it is retained by the cover plates 51. The guide block 50 is hinged to the vertical flange of the bracket 34 by means of hinge leaves 52 connected by a removable hinge pin 53, as shown in Figs. 2, 3 and 4. A coil spring 54 normally retains the swinging guide block 50 with the end of the slide 48 remote from the cutter bearing against a fixed stop bar 55 secured to the vertical flange of the bracket 34, the end of the slide being bent at a right angle to receive an adjusting screw 56 and lock nut 57 for adjusting its inward movement as hereinafter described. A spring 58, mounted in the block 50 behind the slide 48, and secured by a cotter pin 59, normally retains the slide 48 at the inner end of its movement to withdraw the cutter 33 from contacting the disc being trimmed.

A hand lever 60 is provided for operating the slide 48, to which it is connected by a link 61 pivoted to a post 62 on the slide 48 slotted to receive it. The inner end of this post projects through the slide and the end of the spring 58 is secured thereto. The outer end of the link 61 is pivoted between the two arms of the hand lever 60, the link being formed from a doubled strip of sheet metal for lightness and strength.

The forked lever 60 is pivoted on the block 50 to swing with it and on it, movement of the lever in the direction to engage the cutter 33 with the edge of the disc being smoothed after the flash has been trimmed off by the cutters 30, 31, first operating to swing all the parts carried by the block around the pivot pin 53 until the block 50 engages flatwise against the vertical flange of the bracket 34, the spring 54 being weaker than the spring 58; and further movement of the lever 60 will move the slide 48 and cutter 33 into cutting relation to the edge of the disc to smooth the latter, the adjusting screw 56 serving to prevent too great movement of the slide toward the edge of the disc by arresting it when the point of the screw 56 engages the end of the block 50, all as shown in dotted lines in Figure 2.

The knives 30, 31 and 33, illustrated in Figures 5 and 6, are readily removable for sharpening by loosening the clamp screws which secure them to their supports, the slots 39 permitting them to be slipped back into place and adjusted to proper cutting position without difficulty.

The operation of the apparatus is so simple as not to require specially trained mechanics. For example, the operator of a nearby press upon which the records are molded places the molded disc on the lower platen 14 with the register pin 19 projecting through the center hole in the disc, and lowers the upper platen to clamp the disc between the platens by raising the hand lever 22 with his right hand and starts the driving motor by means of the switch 21 if it is not already running. With his left hand the operator grasps the handle 44 of the cutter knife lever 37 and raises it, forcing the upper cutter 31 down against the edge of the record disk immediately over the lower cutter knife 30, which is adjusted to project slightly above the top face of the lower platen 14, and severing an annular strip from the edge of the disc comprising the flash made by the forming dies, which falls free from the disc and cutters.

Without unclamping the disk the operator thereupon pulls the lever 60 toward him with his right hand and swings the block 50 and slide 48 carrying the smoothing cutter 33 around until the block strikes the vertical flange of the bracket 34, whereupon the slide moves to the left and carries the cutter against the edge of the rotating disc and trims off the slight fin left by the cutting knives and at the same time rounds and smooths the edge of the disc. Both levers are then released and the operator unlatches the hand lever 22 to permit the upper platen to rise and unclamp the disk. It is not necessary to stop the motor, as the lower platen will stop rotating when the upper platen is raised, and the trimmed and finished disk can be removed by hand, together with the annular strip of flash which is discarded. This procedure enables the disk to be trimmed and finished at the same setting, thus insuring accurate coaxial alinement of the disk and platens during both operations. The dimensions and clearances of the platens and brackets are such that a number of trimmed flashes can be accumulated below the lower platen and removed all at one time by another operator to save time of the press operators if desired.

For convenience one trimming machine can be positioned between two presses and serve both, the operator of one press performing a pressing operation while the operator of the other press is trimming a formed disk.

The apparatus shown in Figs. 2 to 4 is self-contained and may be adapted to any vertical spindle machine tool having a table suitable to receive it. Our invention is not restricted to any particular kind of press or machine tool as it can be constructed for use in many ways that will occur to those skilled in the machine tool and circular disk forming arts.

We claim the following as our invention:

1. An edge trimming attachment for a rotary platen machine for operating on disks comprising a support mounted to one side of the principal axis of the machine adjacent a platen thereof, a cutting knife adjustably mounted on said support near the edge of said platen for adjustment in the general direction of said axis, a lever pivoted to said support having a cutting knife at its free end, the arc of movement of said second knife being generally in the direction of said axis as said knife approaches the first knife whereby said knives are in edge to edge alinement at the end of said movement, and manual means for actuating said lever.

2. An edge finishing attachment for a rotary platen machine for operating on disks comprising a support mounted to one side of the principal axis of the machine adjacent a platen thereof, a forming knife mounted on a slide adapted to move transversely to said principal axis to advance said knife toward the edge of said platen, a movable guide member for said slide, a lever pivoted to said guide member and connected to said slide by a link pivoted to said slide and lever at its ends, and manual means for actuating said lever to move said guide member and slide.

3. In an attachment as set forth in claim 2, hinge means between said guide member and its support permitting said guide member to swing about an axis parallel to the principal axis of the machine whereby movement of said lever in a direction away from said principal axis causes withdrawal of both said slide and guide member from proximity to said platen.

4. In an attachment as set forth in claim 3, spring means connected to said slide and guide member tending to withdraw said slide and cutter from proximity to said platen, and spring means between said guide member and its support tending to swing said guide member, slide and cutter away from proximity to said platen, said first spring being stronger than said second spring whereby upon movement of said lever to withdraw said forming knife from working position said slide moves first and thereafter said guide member swings away from said platen, and vice versa.

ROBERT W. KECK.
HARVEY F. FILLMAN.

REFERENCES CITED

The following references are of record in the file of this patent:

UNITED STATES PATENTS

| Number | Name | Date |
|---|---|---|
| 239,945 | Elliott | Apr. 12, 1881 |
| 379,602 | Philbrick | Mar. 20, 1888 |
| 382,414 | Edison | May 8, 1888 |
| 1,704,957 | Tyden | Mar. 12, 1929 |
| 1,885,848 | March | Nov. 1, 1932 |
| 2,410,443 | Hoffer | Nov. 5, 1946 |

FOREIGN PATENTS

| Number | Country | Date |
|---|---|---|
| 669,297 | France | Nov. 14, 1929 |